(12) United States Patent
Putman et al.

(10) Patent No.: US 11,209,795 B2
(45) Date of Patent: Dec. 28, 2021

(54) ASSEMBLY ERROR CORRECTION FOR ASSEMBLY LINES

(71) Applicant: Nanotronics Imaging, Inc., Cuyahoga Falls, OH (US)

(72) Inventors: Matthew C. Putman, Brooklyn, NY (US); Vadim Pinskiy, Akron, OH (US); Eun-Sol Kim, Cliffside Park, NJ (US); Andrew Sundstrom, Brooklyn, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 3 days.

(21) Appl. No.: 16/853,620

(22) Filed: Apr. 20, 2020

(65) Prior Publication Data

US 2020/0293019 A1  Sep. 17, 2020

Related U.S. Application Data

(63) Continuation-in-part of application No. 16/587,366, filed on Sep. 30, 2019, which is a continuation of application No. 16/289,422, filed on Feb. 28, 2019, now Pat. No. 10,481,579.

(60) Provisional application No. 62/836,192, filed on Apr. 19, 2019, provisional application No. 62/931,448, filed on Nov. 6, 2019, provisional application No. 62/932,063, filed on Nov. 7, 2019.

(51) Int. Cl.
*G05B 19/406* (2006.01)
*G05B 19/19* (2006.01)
*G06N 20/20* (2019.01)

(52) U.S. Cl.
CPC .......... *G05B 19/406* (2013.01); *G05B 19/19* (2013.01); *G06N 20/20* (2019.01); *G05B 2219/40556* (2013.01)

(58) Field of Classification Search
CPC .......... G05B 19/19; G05B 19/406; G05B 19/41805; G05B 2219/31027; G05B 2219/32177; G05B 2219/40556; G06N 20/20; G06N 3/006; G06N 3/0445; G06N 3/0454; G06N 3/0472; G06N 3/088
See application file for complete search history.

(56) References Cited

U.S. PATENT DOCUMENTS

| | | |
|---|---|---|
| 4,433,385 A | 2/1984 | Gasper et al. |
| 5,027,295 A | 6/1991 | Yotsuya |
| (Continued) | | |

OTHER PUBLICATIONS

Sparse Autoencoder; CS294A Lecture Notes; Andrew Ng.
(Continued)

*Primary Examiner* — Chun Cao
(74) *Attorney, Agent, or Firm* — DLA Piper LLP (US)

(57) ABSTRACT

Aspects of the disclosed technology provide a computational model that utilizes machine learning for detecting errors during a manual assembly process and determining a sequence of steps to complete the manual assembly process in order to mitigate the detected errors. In some implementations, the disclosed technology evaluates a target object at a step of an assembly process where an error is detected to a nominal object to obtain a comparison. Based on this comparison, a sequence of steps for completion of the assembly process of the target object is obtained. The assembly instructions for creating the target object are adjusted based on this sequence of steps.

20 Claims, 3 Drawing Sheets

(56) References Cited

U.S. PATENT DOCUMENTS

| | | | |
|---|---|---|---|
| 5,815,198 | A | 9/1998 | Vachtsevanos et al. |
| 10,481,579 | B1 | 11/2019 | Putman et al. |
| 2004/0070509 | A1 | 4/2004 | Grace et al. |
| 2007/0177787 | A1 | 8/2007 | Maeda et al. |
| 2008/0100570 | A1* | 5/2008 | Friedrich ............ G05B 19/409 345/156 |
| 2009/0198464 | A1 | 8/2009 | Clarke et al. |
| 2014/0247347 | A1 | 9/2014 | McNeill et al. |
| 2018/0180085 | A1* | 6/2018 | Watanabe ............... F16B 33/06 |
| 2018/0376067 | A1 | 12/2018 | Martineau |
| 2019/0064766 | A1* | 2/2019 | Friebolin ............ G05B 19/406 |
| 2019/0386595 | A1* | 12/2019 | Fujita .................. H02P 21/0014 |
| 2020/0310380 | A1* | 10/2020 | Sun .................... G05B 19/4155 |

OTHER PUBLICATIONS

Playing Atari with Deep Reinforcement Learning; Volodymyr Mnih et al.; DeepMind Technologies; arXiv:1312.5602v1 [cs.LG] Dec. 19, 2013.

Probabilistic Robotics; Sebastian Thrun et al.; 1999-2000.

Anomaly Detection Using Autoencoders with Nonlinear Dimensionality Reduction; Mayu Sakurada et al.

Addressing Function Approximation Error in Actor-Critic Methods; Scott Fujimoto et al.; arXiv:1802.09477v3 [cs.AI] Oct. 22, 2018.

Generative Adversarial Nets; Ian J. Goodfellow et al.; Departement d'informatique et de recherche opérationnelle Université de Montréal, Montréal, QC H3C 3J7.

Leveraging Demonstrations for Deep Reinforcement Learning on Robotics Problems with Sparse Rewards; Mel Vecerik et al.; arXiv:1707.08817v2 [cs.AI] Oct. 8, 2018.

Continuous Control With Deep Reinforcement Learning; Timothy P. Lillicrap et al.; arXiv:1509.02971v6 [cs.LG] Jul. 5, 2019; Published as a conference paper at ICLR 2016.

Visual Feedback Control of Hand Movements; Jeffrey A. Saunders and David C. Knill; The Journal of Neuroscience, Mar. 31, 20004.

Intelligent Manufacturing in the Context of Industry 4.0: A Review; Ray Y. Zhong, Xun Xu, Eberbard Klotz, Stephem T. Newman; Department of Mechanical Engineering, The University of Auckland, Auckland 1142, New Zealand; http://dx.doi.org/10.1016/J.ENG.2017.05.015.

Vision-Based Fault Detection in Assembly Automation; by Greg Szkilnyk; Queen's University, Kingston, Ontario, Canada; Jun. 2012.

Nvidia's researchers tech a robot to perform simple tasks by observing a human; Frederic Lardinois; https://techcrunch.com/2018/05/20/nvidias-researchers-teach-a-robot-to-learn-simple-tasks-by-observing-a-human/?utm_source=tcfbpage&utm_medium=feed&utm_campaign=Feed%3A+Techcrunch+%28TechCrunch%29&sr_share=facebook.

Real-time Hand Tracking under Occlusion from an Egocentric RGB-D Sensor; Max-Planck-lnstitute for Informatics, Germany Universidad Rey Juan Carlos, Spain; Franziska Mueller, et al.

The Probabilistic Basis of Jaccard's Index of Similarity; Department of Animal Biology, Faculty of Science, University of Malaga, Malaga 29071, Spain; Raimundo Real and Juan M. Vargas.

A Method For Stochastic Optimization; Published as a conference paper at ICLR 2015; Diederik P. Kingma and Jimmy Lei Ba.

Hand Keypoint Detection; Carnegie Mellon University; Tomas Simon, et al.

Parametric Image Alignment Using Enhanced Correlation Coefficient Maximization; IEEE Transactions on Pattern Analysis and Machine Intelligence, vol. 30, No. 10, Oct. 2008; Georgios D. Evangelidis and Emmanouil Z. Psarakis.

* cited by examiner

ASSEMBLY ERROR CORRECTION FOR ASSEMBLY LINES

CROSS-REFERENCE TO RELATED APPLICATIONS

This application is a continuation-in-part application of U.S. patent application Ser. No. 16/587,366, entitled "DYNAMIC TRAINING FOR ASSEMBLY LINES," filed Sep. 30, 2019, which is a continuation of U.S. application Ser. No. 16/289,422, entitled "DYNAMIC TRAINING FOR ASSEMBLY LINES," filed Feb. 28, 2019, now U.S. Pat. No. 10,481,579. Further, this application claims the benefit of U.S. Provisional Application No. 62/836,192, entitled "A COMPUTATION MODEL FOR DECISION-MAKING AND ASSEMBLY OPTIMIZATION IN MANUFACTURING," filed Apr. 19, 2019; U.S. Provisional Application No. 62/931,448, entitled "A COMPUTATION MODEL FOR DECISION-MAKING AND ASSEMBLY OPTIMIZATION IN MANUFACTURING," filed Nov. 6, 2019; and U.S. Provisional Application No. 62/932,063, entitled "DEEP LEARNING QUALITY PREDICTOR FOR MANUAL ASSEMBLY VIDEO ANALYSIS, filed Nov. 7, 2019. The entire contents of the aforementioned applications and patent are incorporated herein by reference.

TECHNICAL FIELD

The subject technology provides improvements to assembly line workflows and in particular, encompasses systems and methods for adaptively updating assembly-line operator instructions based on feedback and feed-forward error-propagation predictions made using machine-learning models. As discussed in further detail below, some aspects of the technology encompass systems and methods for automatically adapting guidance videos provided at one or more operator stations based on inferences made about manufacturing or assembly deviations.

In conventional assembly-line work flows, human (operator) monitoring and expertise are required for detecting manufacturing errors, and for determining how the errors can be remedied through modifications in downstream processes. Note, assembly and manufacture, and assembly-line and production-line, are used interchangeably herein. Due to reliance on human assembly error detection, there is a high likelihood that errors go unnoticed (or unreported), and subsequently propagated downstream in the assembly process. Additionally, many assembly workers are only trained to perform a narrow set of tasks and therefore may not recognize how to modify their own workflows to best rectify an error that originated upstream in the assembly workflow.

In conventional manufacturing workflows, the fixing of human error in one part of a manual inspection process is often dealt with by taking corrective action on that human node. If there is continued problems with that human, she is often replaced with another human, who like all of us, is vulnerable to many of the same limitations. It is difficult to repeat an action over long days and nights for years without error, and it is not within the rights of most assemblers to take corrective action. Even if these rights were given, it would be inconsistent, and informed only by the experience that the human has in the application of that single process node. Additionally, there is no mechanism to learn from any mistake, or even any positive corrective action.

Further, electronic monitoring of an assembly line is limited and does not include robust mechanisms to provide on-the-fly adjustments to downstream steps in an assembly line to compensate for errors that occurred in upstream steps. Moreover, new mechanisms are needed to evaluate how variations in operator motions and/or variations in assembly patterns impact the resulting product of manufacture and to provide corrective action to improve the performance and/or properties of a product of manufacture.

SUMMARY

In some aspects, the disclosed technology relates to a method for optimizing workflow in an assembly line, the method including steps for: detecting an error in assembly of a target object at a step of an assembly of the target object, evaluating the target object at the step of the assembly process and a nominal object to obtain a comparison, and determining, based on the comparison, a sequence of steps needed to minimize a deviation between the target object and the nominal object. In some aspects, the method can further include steps for adjusting assembly instructions for the target object based on the sequence of steps.

In another aspect, the disclosed technology encompasses a system for optimizing workflow in an assembly line, the system including a plurality of image capture devices, wherein each of the image capture devices is disposed at a different position to capture movement of an operator during an assembly process of a target object, and an assembly instruction module configured to automatically modify guidance and instructions provided to the operator, wherein the assembly instruction module is coupled to the plurality of image capture devices. The assembly instruction module can be configured to perform operations including receiving motion data from the plurality of image capture devices, wherein the motion data corresponds to performance of a set of steps by the operator to assemble the target object, and determining, based on the motion data and at a step of the set of steps, an error in assembly of the target object. In some implementations, the assembly instruction module can be further configured to perform operations for evaluating the target object at the step of the set of steps and a nominal object to obtain a comparison, determining, based on the comparison, a sequence of steps needed to minimize a deviation between the target object and the nominal object, and adjusting assembly instructions that are provided to the operator based on the sequence of steps. The form of modified assembly instructions may include but is not limited to generated or edited video of motion data, text-based instruction from natural language processing (NLP) of identified deviations, or other feedback mechanisms to the operator(s).

In yet another aspect, the disclosed technology relates to a non-transitory computer-readable media comprising instructions stored thereon which, when executed by one or more processors, are configured to cause the processors to execute instructions including detecting, at a step of an assembly process of a target object, an error in assembly of the target object, evaluating the target object at the step of the assembly process and a nominal object to obtain a comparison, and determining, based on the comparison, a sequence of steps needed to minimize a deviation between the target object and the nominal object. In some implementations, the instructions can further be configured to cause the processors to perform operations for adjusting assembly instructions for the target object based on the sequence of steps.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
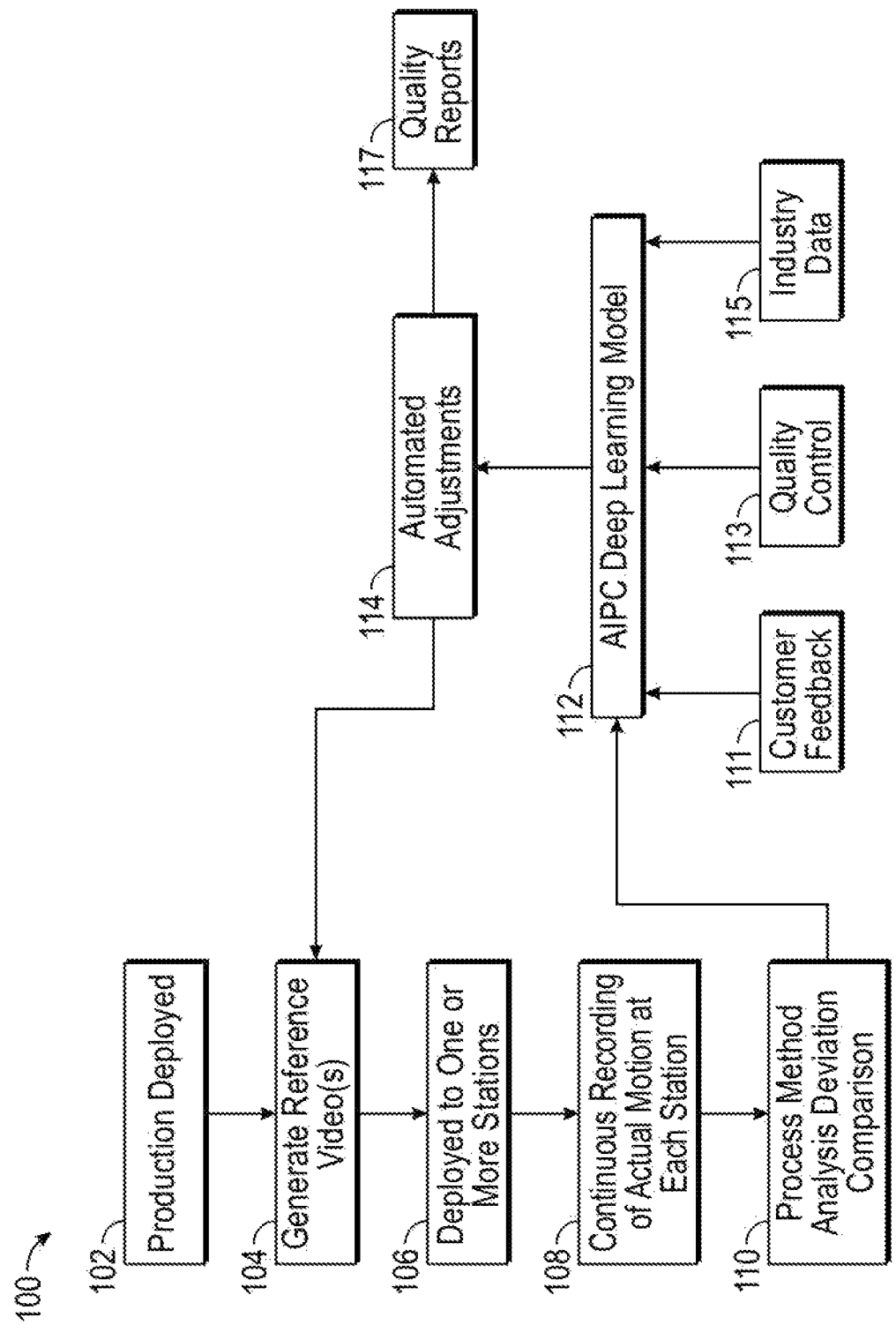
FIG. 1 conceptually illustrates a flow chart of an example production line deployment, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Aspects of the disclosed technology address the foregoing limitations of conventional assembly-line process flows by providing methods for tracking, training, and progressively improving production line assembly and the resulting product of manufacture. Improvements are realized by providing dynamic visual or other feedback and instructions to each assembly operator, and in some implementations, operator feedback is based on errors, which can include, but is not limited to, assembly errors, inefficient processes and/or motions, inferior products, detected at one more points in the production line.

By implementing the disclosed technology, the speed of error correction can be significantly improved over that of manual implementation methods, for example, by rapidly altering and changing reference/instruction information provided at each station (or all stations) based on near real-time error detection. Although some embodiments described herein discuss the use of reference/instruction information in the form of video, other formats are contemplated. For example, assembly/manufacturing instructions can be provided to an assembly operator as audible, visual, textual, and/or tactile cues or other forms of reference. By way of example, audible instruction information could include spoken instructions, or other audible indicators. Visual assembly instruction information can include video or animated formats, such as using an augment reality (A/R) or virtual reality (V/R) system. In some aspects, visual assembly instructions can be provided as animations that provide examples as to how a work piece (or tool) is to be manipulated by an operator at a given station in the assembly line. Additionally, in some aspects, the assembly/manufacturing instructions can include machine instructions, for example, that can be received and implemented by a robotic assembly operator or a machine assembly operator. The term operator, as used herein, can refer to a human, a robot or a machine that uses motion to assemble a product of manufacture. Additionally, the term operator encompasses human-assisted manufacturing implementations, such as in instances where human operators work in conjunction with, or that are aided by a robot or machine implement.

In instances wherein the assembly/manufacturing instructions are provided as reference/instruction videos, such videos are sometimes referred to as standard operating protocols (SOPs). Systems of the disclosed technology can be efficiently deployed, due to minimal hardware requirements, e.g., using video cameras and displays for each operator, whereas machine learning training, updating and error propagation can be performed at a centralized computing resource, such as in a computing cluster or in a cloud environment.

In some aspects, video instruction information can be provided to one or more operators as part of an augmented reality display. That is, instructions or deviations from standard assembly/manufacturing methods can be communicated to an operator using augmented reality, wherein a display is provided as a mix of enhanced video, animated graphics, and/or video data representing recorded scenarios. By way of example, augmented reality displays can provide instructions or guidance provided as animated or graphical overlays to real-time feeds of a work piece that is being assembled, and/or a tool that is being used in the assembly/manufacture process.

In some implementations, a system of the disclosed technology includes one or more video or motion capture devices disposed at various operator stations in a production line. Capture devices are configured to record the operator's motion/interaction with a part, device, material or other tool ("component"), at that specific station. In some aspects, operator motion can be captured using video recordings, however, other motion capture formats are contemplated, for example, using 3-D point clouds representing operator motion and/or an operator's interaction with a tool or product of manufacture. Further, a reference video for each station can be created by recording the motions of one or several experts for a specific station, and the experts' interaction with a component at that station. This video can be created from a single example of the expert's actions or from multiple examples. The motion path for each expert can be extracted, and in the embodiments where several experts or several examples are used, a computation can be performed on the set of extracted motion paths (e.g., an average) to create a reference video for a specific station. The reference video can be in the form of a digital or an animated rendering of the motion path to be performed at the specific station. Note, an expert can refer to anyone who is skilled or knowledgeable on a particular assembly step for which guidance is being provided.

In some embodiments, video or motion capture devices disposed at various operator stations in a production line can also capture attributes (e.g., quality, tensile strength, number of defects) of a work piece/component/tool at the respective stations that can be used to compute assembly errors.

By capturing the operator's interactions at their respective station, operator errors can be detected by comparing the captured interactions with a baseline (ground truth) model representing an ideal/expert operator interaction/workflow. That is, operator deviations from the idealized interaction model can be used to compute assembly errors that can be fixed at various locations in assembly chain, e.g., by altering operator instructions/guidance provided at different stations. In addition, the quality of a component can be captured at each station and compared to a baseline component for that station. Deviations of a component from a baseline component can also be used to assign a quality grade to the component at the specific station or to compute operator/ assembly errors that can be fixed by altering operator instructions/guidance provided to various stations.

Assembly corrections can be performed in various ways, depending on the desired implementation. In some aspects, operator variations/errors can be used to perform classification, for example, by classifying parts into quality grades (e.g., A, B, C, etc.), and subsequently directing those parts into an appropriate production line. In another aspect, detected assembly errors can be used to alter the process at a given station to improve quality and reduce variation. That is, detected assembly errors can be used to automatically provide instructions or guidance at the same station, for example, to rectify an error that was caused at that station (e.g., in-station rework). NLP may be used to process instruction or guidance to an operator. For instance, NLP may be used to translate spoken instruction into textual form, or to translate textual instructions into spoken form.

For example, assembly error detection may be used to drive updates/changes to operator instructions or videos provided at a given station where errors are known to occur. By way of example, if errors/deviations are identified as originating with a first operator working at a first station, then assembly instructions provided to the first operator e.g., via a display device at the first station can be altered to reduce error variance associated with the article of manufacture leaving the first station.

In another aspect, detected assembly errors can be used to alter subsequent station assembly to overcome station variance. That is, error detection can be used to automatically trigger the downstream propagation of new/updated assembly guidance based on errors caused by an upstream operator. For example, error variance for motions executed by the first operator can be used to adjust assembly instructions that are provided to a second operator associated with a second station that is downstream from the first station.

In yet another aspect, error variance detected across all stations can be forward propagated to ensure that whole or partial reworks can be performed over the course of the entire remaining downstream assembly chain. That is, errors generated across one or more stations can be fixed/reduced by adjusting assembly instruction provided to one or more downstream operators. In one example, error variance in an article of manufacture caused by a first operator at a first station may be fixed through operations sequentially executed by a second operator at a second station, and a third operator at a third station, i.e., by adjusting assembly instructions that are provided at the second and third stations.

In another example, error variance accumulated across multiple stations can be reduced by one or more subsequent stations. For example, error variance in an article of manufacture accumulated across a first station and a second station can be subsequently fixed by adjusting assembly instructions that are provided to at a third station and a fourth station (e.g., to a third operator and a fourth operator, respectively).

By treating each operator/operator station in an assembly flow as a network node, machine learning models can be used to optimize the assembly process by minimizing errors through the reduction of assembly variance at each node (station). By minimizing individual node (operator) variance, as well as performing real-time updates to mitigate forward error propagation, systems of the disclosed technology can drastically reduce manufacturing variance for end products. Additionally, by accurately quantifying and tracking error contributions from specific segments in an assembly workflow, products can be graded and classified by product quality or deviation quantity. As such, products of certain quality classifications can be steered to different manufacturing processes, or to different customers, i.e., depending on product quality.

Machine-learning/artificial intelligence (AI) models may be used to perform error detection and/or to perform modifications necessary to optimize station assembly changes. By way of example, machine-learning models can be trained using multiple sources of training data, including, but not limited to: end product ratings, end product variation statistics, desired end product characteristics (e.g., assembly time, amount of material used, physical properties, a number of defects, etc.), station specific component ratings, station specific component variations, desired station component characteristics. Additionally, deployed machine learning models can be trained or initialized based on inputs provided from experts or "master designers," such that institutional knowledge can be represented in the idealized models used to perform error detection and error quantification calculations.

As understood by those of skill in the art, machine learning based classification techniques can vary depending on the desired implementation, without departing from the disclosed technology. For example, machine learning classification schemes can utilize one or more of the following, alone or in combination: hidden Markov models; recurrent neural networks; convolutional neural networks (CNNs); reinforcement learning; deep learning; Bayesian symbolic methods; generative adversarial networks (GANs); support vector machines; image registration methods; applicable rule-based system; and/or any other suitable artificial intelligence algorithm. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

In some implementations, multiple different types of machine-learning training/artificial intelligence models may be deployed. By way of example, general forms of machine learning can be used in order to dynamically adjust the assembly line process in order to optimize the product of manufacture. As recognized by those of skill in the art, the selected machined-learning/artificial intelligence model(s), does not simply contain a set of assembly/manufacturing instructions, but is a way to provide feedback on the entire assembly line process and its impact on the resulting product of manufacture, as well as to provide dynamic adjustments to the downstream operator stations in the assembly line, to compensate for actions occurring in upstream operator stations. This type of artificial-intelligence based feedback and feed-forward model is referred to herein as Artificial Intelligence Process Control (AIPC). In some embodiments, the machine learning may be based on a deep learning model in a simulated environment that utilizes targeted gated recurrent unit (GRU) model-based learning and Hausdorff distance minimization to efficiently search the space of possible recovery paths to find the optimal path to correct an error during the assembly process. In further embodiments, for example, a machine learning algorithm can be based on a Long Short-Term Memory model to analyze video input of an assembly process and predict a final quality output. Further, machine learning models may also be used in the form of NLP algorithms to adjust the feedback to operator stations, such as converting text into speech or speech into text in order to maximize operator compliance and understanding of adjusted instructions.

In some embodiments, errors during a manual assembly process may be corrected using a computational model that utilizes machine learning.

A target object may be assembled through a sequence of steps as defined by a procedure. During the process, an irreversible error may occur at a particular step k in which any remaining operations will need to be altered in order to obtain the final configuration of the nominal object. In some embodiments, an approach to correct the error may involve: comparing the flawed target object at step k against the nominal object at the same step k, or comparing the flawed target object at step k against the nominal object in its final configuration. These comparisons may be used to determine the sequence of steps that are necessary to minimize the deviation between the final configuration of the flawed target object and the final configuration of the nominal object. In some embodiments, a quality metric of the target object may also be used to guide the correction of the flawed target object.

A general numerical approach may solve the problem by using a Hausdorff distance algorithm to determine how similar the sequence of k steps for assembling the flawed target object is to the sequence of steps for assembling the nominal object to its final configuration. A few ways to computationally minimize the Hausdorff distance between the sequence of k steps in the flawed assembled object and the sequence of steps in the final assembled nominal object is to optimize the Markov Decision Process (MDP) through an instantaneous reward formulation, a multiple reward formulation, or a delayed reward formulation. However, the search spaces associated with these formulations require a significant amount of computational resources.

As an alternative, a machine learning framework may be developed with a delayed reward policy agent using reinforcement learning. The reinforcement learning framework may be designed to allow a policy agent to determine the appropriate steps that are necessary to correct the error in the flawed target object and obtain a final configuration with a performance metric that matches the performance metric of the nominal object. The reward given to the policy agent is delayed, where the policy agent is only rewarded when the final step has been executed.

In some embodiments, a design for an optimal/desired product of manufacture can be selected and a skilled operator can be deployed to carry out each step that is performed at each operator station for the assembly of the product of manufacture according to the selected design. Optimal can be based on the desired performance and/or properties of the resulting product (e.g., if the product of manufacture were a paper plane, then an optimal paper plane might be one that achieves the desired flight goals), minimizing errors in the resulting product of manufacture, or some other criteria. Multiple imaging devices can be used to capture the operator's motions and his interactions with the product of manufacture that he is assembling to generate video, images and/or 3D point cloud data. The captured data can provide granular information such as: an operator's hand coordinates in relation to the product of manufacture as it is being assembled, the relationship of one hand to another, and the relationship of the fingers (and in some embodiments, the joints in the fingers) to the product of manufacture as it is being assembled. The data collected from the skilled operator can be used as a ground truth for assembly of an optimal/desired product of manufacture. This ground truth from a single example on its own may be sufficient for use in creating initial machine learning models, or additional data may be collected. For instance, to understand how variations in an operator's motion or errors may impact the resulting product of manufacture, many operators can be deployed to carry out one or more steps in the assembly of an optimal product of manufacture. This can be done for each operator station in the assembly line. The resulting end products and their respective assembly processes can be compared both to each other and to the ground truth to determine how errors and/or variations in an operator's motion can affect the properties and/or performance of the product of manufacture (e.g., an operator's speed might result in poorer quality planes). The data collected based on operators during an actual assembly process (i.e., a process where humans, robots or machines are performing motions at one or more stations) will be referred to herein as "actual training data." The actual training data can be supplemented with simulated data to obtain a richer data set and to provide additional variations for achieving an optimal product of manufacture. Note, the terms "optimal" and "desired" will be used interchangeably herein.

In some embodiments, the different AI/machine-learning/deep learning models discussed herein can be deployed in a specific order as set forth below to achieve Artificial Intelligence Process Control (AIPC) to optimize the assembly of an article of manufacture. Example processes in which an AIPC deep learning model can be implemented are discussed in further detail with respect to FIG. 1 (e.g., in relation to AIPC deep learning model 112), and FIG. 2. Examples of hardware systems and/or devices that can be used to implement an AIPC deep learning model are provided in FIG. 3 and the corresponding description, below.

First, CNNs can be used in the assembly line process to classify features of an operator's hands and articles of manufacture in different configurations, at each operator station.

Second, reinforced learning (RL) and RL agents can be used and rewarded for achieving desired outcomes, both from the CNN classifications, and for predefined desirable outcomes. The RL agents can be supervised or unsupervised.

Third, Generative Adversarial Networks (GANs) can be used to choose between conflicting RL agents. GANs can involve minimal human supervision, relying on humans only for selecting which RL agents to input as nodes to the GANs.

Fourth, RNNs can take the winning RLs as input nodes to create a feedback and feed-forward system, so that learning can be continuous and unsupervised.

The implementation of these four AI/machine-learning models are discussed in greater detail below:

In some embodiments, actual training data can be inputted into a CNN to classify relevant data in the assembly process, for example, to classify which fingers/hands were used at each step of assembly for each operator station, which portions of the product being assembled were an operator's fingers touching at any point in time and space, and the shape or configuration of the product of manufacture being assembled at any point in time and space.

In further embodiments, data can also be collected that does not track hand motion, but represents different variations in the assembly pattern of the product of manufacture (e.g., if the product of manufacture is a folded paper plane, then data can be collected based on changing the folding order, implementing folding variations and/or introducing potential errors, if the product of manufacture is an article of clothing, then data can be collected, for example, based on stitching order, implementing stitching variations and/or introducing potential errors). This data can be simulated and/or collected from actual training data. The resulting products of manufacture and their respective assembly processes can be compared to determine how errors or variations in assembly patterns affect the properties and/or performance of the product of manufacture.

In some embodiments, the captured data (e.g., video and hand tracking of the assembly process, etc.) is used to predict the quality of the final output. This quality prediction enables the use of the captured data to group products into quality bins without the need to manually inspect the quality of the product during the manufacturing process and enables downstream corrective action.

In some embodiments, a system may be focused on the manual assembly of a target object in which the assembly process comprises a number of discrete steps where the operators perform different operations on the target object per a set of instructions. A system may be constructed with a machine learning framework using a deep learning model that establishes a correlation between the time series of an operator's hand positions and the final quality of the target object (sum of all operator actions). In some embodiments, the model may be comprised of two neural networks where the first is used to extract the hand position data of an operator in a 3D environment and the second is used to distill the hand position data into a correlation with the final quality of the performance of the target object.

In some embodiments, the first neural network can use a video acquisition system to record video of the operator's hands during the assembly process in different node videos, corresponding to each discrete step that the operator performs in connection with assembling the target object. For instance, an operator can perform the assembly process with a number of cameras located in different locations and configured to record the assembly process simultaneously. These cameras may be used to capture videos multiple times at prespecified positions of the operator's hands. These videos may then be processed to extract a number of images, or landmark frames, that represent the entire assembly process of the target object. Using these landmark frames, hand tracking information may be extracted that help define the location, or key points, of the operator's hands and fingers during the assembly process.

In some embodiments, to extract hand tracking information a bounding box estimation algorithm and a hand keypoints detector algrorithm may be applied. In particular, the bounding box estimation algorithm may include processing the landmark frames from the assembly process with a threshold image segmentation to obtain a mask image for an operator's hands. The hands may be located on the mask using blob detection. The bounding box estimation uses the mask images to form boxes around each of the operator's hands such that the boxes include the highest point of the shape of a hand position to at least up to the wrist point of the hand. The bounding boxes and their corresponding landmark frames are then fed into a hand keypoints detector algorithm.

The hand keypoints detector algorithm may include a machine learning model that is able to detect specific key points on an operator's hands. The hand keypoints detector algorithm may estimate, not only the key points that are visible in a landmark frame, but also the key points that are occluded from the frame due to articulation, viewpoints, objects, and hand interactions. Because different hand positions produce different occluded points in different frames, certain occluded points in one frame may not be occluded in other frames. The hand keypoints detector estimates the location of the key point that is occluded with a certain level of confidence. However, estimating the location of the key point that is occluded may result in the same key point location being recorded for different hand positions. The hand key points defining the operator's hands during the steps of the manual assembly process are then provided to the second neural network.

In some embodiments, the second neural network is used to predict a quality of the final state of the assembled object. In some embodiments, the neural network may be based on a Long Short-Term Memory (LSTM) model. The LSTM has a number of cells that are sequenced and together represent the entire assembly process of a final object. The input to an LSTM cell may be hand key point data corresponding to the operations of an operator at a particular step in the assembly process represented by the LSTM cell. Each cell in the LSTM decides if the information from the previous cell should be stored, chooses which values to update, performs the updates to the cell, chooses which values to output, and then filters the values such that the cell only outputs the values that were chosen. The LSTM may be a sequence-to-one model trained using an Adam optimizer or other adaptive learning rate optimization algorithm. Using an LSTM framework, the neural network correlates the input data, extracted from the manual assembly process, to determine a quality measurement of the final product.

In some embodiments, the video and hand tracking information representing the assembly process for a target object, or input data, used to train the model may be collected from multiple operators performing the assembly process to assemble multiple target objects using a single set of assembly instructions. The target objects assembled by the operators may be used in a controlled environment to collect corresponding quality measurements for the performance of the assembled objects, or output data, needed for training the model.

In some aspects, training data used to generate a machine-learning model can come from simulated data, from actual training data, and/or from the ground truth recording of an expert, in combination or separately. In some embodiments, a machine-learning model, for example (but not limited to) a Reinforcement Learning (RL) agent can be built using the simulated data results. In other embodiments, a machine-learning model, for example (but not limited to) a Reinforcement Learning (RL) agent can be built using actual training data. An RL agent is rewarded for achieving good/desired outcomes and punished for bad outcomes.

In some instances, many RL agents (some based on actual training data and some based on simulated data) can be deployed to work in tandem, and configured to maximize a cumulative award: e.g., assembling a product of manufacture that has the smallest deviation from an ideal model/example. Example outcomes for which an RL agent may be rewarded include: completing a perfect product of manufacture in as few steps as possible, reducing the amount of material or time required to achieve the product of manufacture. RL agents based on simulated data and RL agents based on actual training data can be used to determine optimal motion patterns and/or optimal assembly patterns that result in the optimal/desired article of manufacture.

These two groups of RL agents (e.g., RL agents created based on actual training data and RL agents created based on simulated data) can now collaborate, and even compete, as they have both been rewarded for actions that make optimal/desired products of manufacture. In some embodiments, data obtained from simulated based RL agents that resulted in optimal assembly patterns for optimal products of manufacture, can be used to reduce the possibility space for actual training data sets. For example, simulated RL agents can be used to determine optimal assembly patterns, and then actual training data can be collected only for the optimal assembly patterns, and not for assembly patterns that are not optimal. By focusing only on collecting actual training data or the optimal assembly patterns, less training data may be collected and/or greater capacity may be available for collecting more actual training data, but only for optimal assembly patterns.

Relying only on reinforcement learning to optimize an assembly line is limited, because rewards will sometimes conflict. For example, in the assembly of a product, some RL agents may be rewarded for the least number of false moves (e.g., folding and immediately undoing that fold, or adding a stitch and immediately taking that stitch out), while others may be rewarded for speed. The RL agents being rewarded for speed may determine that more false moves lead to faster assembly time, because fewer corrections are needed downstream in the assembly process. Making such implementation tradeoff decisions is not something that is easy for humans to figure out. Even with experience and large amounts of examples, humans still lack the computational ability to understand the subtleties of how an ultimate outcome results from different operator working in different ways.

To solve these conflicting RL agent optimizations, GANs may be deployed to act as arbiters. The conflicts can be between RL agents based on actual training data, between RL agents based on simulated data, and/or between an RL agent based on actual training data and an RL agent based on simulated data.

In some embodiments, GANs can test each of the RL agents and store the results in order to create an even more robust neural network. GANs work by taking the RL agents and using a model that produces a winner and a loser in a zero-sum game. In GANs there are "generators" and "discriminators." The generator, in this case, will store the reward data from the conflicting RL agents, and the discriminator will evaluate which of these is most relevant to the task of creating a desired product of manufacture. The GANs use a deep network of nodes (or neurons) to decide how to weight the nodes. Since each RL agent believes that it has already made the optimal decision, it is the GANs role to determine which of the conflicting RL agents actually made the most relevant choices, and the discriminator adjusts the weights accordingly. When a zero-sum game is played between conflicting RL agents, a group of winners between the conflicting RL agents are produced, and only those winners will be used for the machine-learning model used to optimize the workflow in an assembly line. Though large amounts of data may have been produced to determine the winning RL agents, the results are much sparser than what was used to create and find these winners used as input nodes.

Once it is determined which RL agents have survived the GANs battle and have been rewarded correctly, in some embodiments, they may be inputted into another AI system called a Recurrent Neural Network (RNN). An RNN has many similarities to a CNN, in that it is a Deep Learning Neural Network, where final outcomes are optimized through various forms of weighting of input data. One difference is that unlike a CNN, which is a linear process from input to output, an RNN is a loop that feeds back the resulting output, and even internal nodes as new training information. An RNN is both a feedback system and a feed-forward system, such as a GRU.

In some embodiments, a machine learning framework may be constructed utilizing a targeted GRU model-based learning. A GRU model may be chosen instead of reinforcement learning because of its predictive power and relatively short training time. GRUs are used in RNNs to distinguish between observations that should be stored in memory, or to update a state, and observations that should be forgotten, or to reset a state.

In some embodiments, a GRU model may be composed of a number GRU cells that correspond to the number of assembly steps required to build a target object. Each GRU cell, which represents one of the number of assembly steps, may have a number of input parameters, and a hidden state output. The GRU cell that represents the final step in the assembly process will output a target object. The model's output is the deviation of the target object from a nominal object. This deviation may be calculated using the stepwise Hausdorff distance from the target object to the nominal object and a performance metric of the final configuration of the nominal object. Each GRU cell is defined by reset, update, and new gates. The GRU neural network is trained iteratively to bias it towards solving specific subproblems and to identify a set of weights for the GRU. For instance, for each iteration, a number of predictions (one for each possible error at a particular step) to complete the assembly process at subsequent steps are generated. Further, corresponding predicted distance measures of the corrected assembly process may be generated. These predicted assembly process completions may be rendered in a virtual representation system and their stepwise Hausdorff distances computed to obtain "ground truth" distance measures. The difference between "ground truth" and predicted distance measures may be computed and fed back into the model, whose network weights are adjusted via backpropagation, producing the next iteration. This process may continue until the set of weights for the GRU is identified. In some embodiments, a stochastic gradient descent method may be used to correct the flawed target object and derive the steps necessary to obtain a final configuration that is satisfactory.

In some embodiments, simulations, such as parametric computer-aided design and drafting (CAD) models of the target object in-process may be generated to develop and validate machine learning models. A CAD system may use a local coordinate frame, which corresponds to the current state of the target object in-process, and input parameters, which represent each assembly step. Using the local coordinate frame of the target object in-process and the input parameters, the CAD system can determine the dimensional information for each assembly step. The CAD system may then generate a three-dimensional CAD model that represents the configuration of the output at each step. The CAD system may continue this process until all steps in the assembly process have been executed and may output a CAD model of the final configuration of the assembled object. CAD models of different configurations may be generated by providing the CAD system a variety of input parameters. To obtain a set of CAD models with a specific range of input criteria, such as length or width, statistical samples of this input criteria may be provided to the CAD system to generate the set of CAD models.

The CAD models can be in varying level of detail and sophistication, though the trained model and system is designed to work specifically with lower detail CAD systems, which allows for generation of extensive number of examples in a non-computationally expensive manner, and provides ample surface morphology detail for model trainined and profiling. In some embodiments, the referenced CAD system can be paired with Finite Element Analysis (FEA) or basic surface modeling tools to generate a structure analysis of the surface. This data can be used as additional quality score for model training and analysis.

In some embodiments, the CAD system can be incorporated into the model training, such that additional surface models can be generated upon the request of examples from the model or need for additional exploration data. This approach pairs with physical observations and allows for pre-trained models to be deployed, without the need for extensive amounts of physical samples of the space.

In some embodiments, CAD models of the final configuration of the assembled object may be used in simulations to generate performance metrics. Using CAD models of the final configuration of an assembled object, simulations may utilize numerical and computational methods to generate performance metrics.

A real-world application of Artificial Intelligence Process Control (AIPC) involves providing feedback to operators in the assembly line that have already completed their task (e.g., by modifying video instruction automatically), as well as providing instructions (also, e.g., by modifying video instruction automatically) to operators downstream in the assembly line who have not yet completed their task ("feed forward"). This feedback-feed forward system, or AIPC, can be achieved with the AI approaches described herein, and in some embodiments, in the particular order described herein, so that operators on an assembly line can make choices that optimize the resulting product of manufacture, without additional human supervision.

In some embodiments, this involves a compression of the system above to just the RNN, and to see every move during the process of creating one or more products of manufacture in two ways: successful or not successful. Each move serves as training. If the output node of the RNN is not optimal, then the network can feedback to an actual individual in the assembly line to make a different choice, and in the path through the many nodes and layers of the RNN the weights can be reweighted and the output will be labeled either successful or not. As the process iterates, the weights improve themselves in accuracy. Additionally, the network can learn what is working and what is not, even if the individual performing the assembly does not. This adds to the training set. It also allows adjustments to be made at different stages of the assembly process. In some cases, it may be discovered that the best way to produce an article of manufacture, at any given moment, with specific characteristics, is to not go back to the start, but to adjust the instructions as the process progresses. The RNN then is always optimizing for the optimal product of manufacture, and learns to provide feedback to each operator at an operator station in a production line that has already performed their task, as well as feeding forward information to operators at operator stations in the production line that have not yet performed their task.

FIG. 1 conceptually illustrates a flow chart of an example process 100 for implementing a production line deployment, according to some aspects of the disclosed technology. The process of FIG. 1 begins with step 102, in which a production deployment is commenced. The workflow of an example production line typically includes multiple operator stations (nodes) in which a work-piece (product) is assembled or manufactured. The various nodes can be organized sequentially such that work at each subsequent node begins only after an operation at the previous node has been completed.

In step 104, one or more reference videos are generated and/or updated. The videos, as explained above, can be used to provide manufacturing/assembly instructions to a particular node (also referred to herein as an operator station). That is, each node in the workflow can be provided with a reference video that delivers guidance for how to complete a step in the manufacturing workflow that corresponds with that specific node.

In step 106, each of the videos generated in step 104 are deployed to a respective station/node. By way of example, a given workflow can include ten nodes, each having a respective and different/unique reference video. In other implementations, the number of videos may be less than a total number of nodes. Depending on implementation, reference videos deployed at various stations/nodes can be unique, or may provide similar guidance/instructions. As discussed in further detail below, content of reference videos can be dynamic, and can be updated/augmented over time.

In step 108, a continuous recording of motion is captured at each station/node. Motion data resulting from the motion recording can describe an operator's interaction with a work-piece/component/tool at their node/station in the workflow. That is, motion data captured at each node can represent one or more operator actions that correspond with a particular portion of a product assembly or manufacture, and can correspond with instructions provided by a reference video associated with that node. In some instances, motion capture can include the capture of video data, i.e., a recording of all or part of an operator's actions at that station. In other embodiments, the motion capture can include the recording of a 3D point cloud, for example, where motion is recorded for one or more specific points in a visual field of the image capture device. Both the operator's actions, as well as attributes of the component (e.g., component quality, tensile strength, number of defects), can be captured at each node/station in the workflow.

In step 110, process method analysis deviation can be computed, wherein motion data captured for one or more of the stations in step 108 can be analyzed to identify any deviations from a comparison model, for example, that includes (or represents) an idealized motion profile of the corresponding station. As illustrated in FIG. 1, step 110 can make use of an AIPC deep learning model (step 112), e.g., that can be configured to identify/classify motion deviations from the comparison model, and to make inferences regarding how the assembly or manufacturing process may have been affected. The comparison can be done on a per station level and/or overall process level. The analysis can also consider the attributes of a component at each station or deviations of a component from a baseline, and how the motion deviations for the station impact the quality of the component.

The AIPC deep learning model called in step 112 can be based on a collection of various types of training data, for example, that may include examples of ideal or quality controlled assembly/manufacturing interactions for a given station/node. The AIPC deep learning model can also be augmented (or adjusted) using data provided by domain/ industry information 115, by feedback from customers on specific products made using process 100 (step 111), by feedback from quality control inspection of the specific products made using processing 100 (step 113). It is understood that the AIPC deep learning model can be implemented using a variety of computing systems, including distributed hardware and/or software modules. By way of example, an AIPC deep learning model can be implemented using a distributed system including multiple image capture devices and display devices that are deployed at an assembly line and coupled to one or more systems configured to implement various AI/machine learning models and/or classifiers.

Once deviations from the comparison model have been detected/identified in step 110, automated adjustments in step 114 can be generated, using AIPC deep learning model 112. As discussed above, video adjustments can be targeted to improve manufacturing/assembly quality at one or more stations in the workflow. For example, video adjustments can be applied to a given node/station where errors are known (or predicted) to originate, for example, in order to change instructions or guidance provided to the operator in a manner that reduces or fixes errors at the point of origin. In other implementations, video adjustments can be applied downstream from a station where an error originated, for example, to correct the error before the manufacturing workflow is completed. In further implementations, once the workflow is completed, the entire workflow can be analyzed and adjustments can be made to one or more stations in the workflow.

In some embodiments, adjustments are made in real time, right after an error has been detected. In other embodiments, adjustments are made at fixed intervals or after the workflow has been completed.

In some aspects, automated adjustments determined at step 114 can be summarized and/or provided as a production quality report at step 117. For example, adjustments resulting from an analysis of motion deviation (step 110) can be used to produce one or more quality reports that describe various quality aspects of a work-piece based on identified deviations from idealized models of the assembly/manufacturing process.

Figure 2:
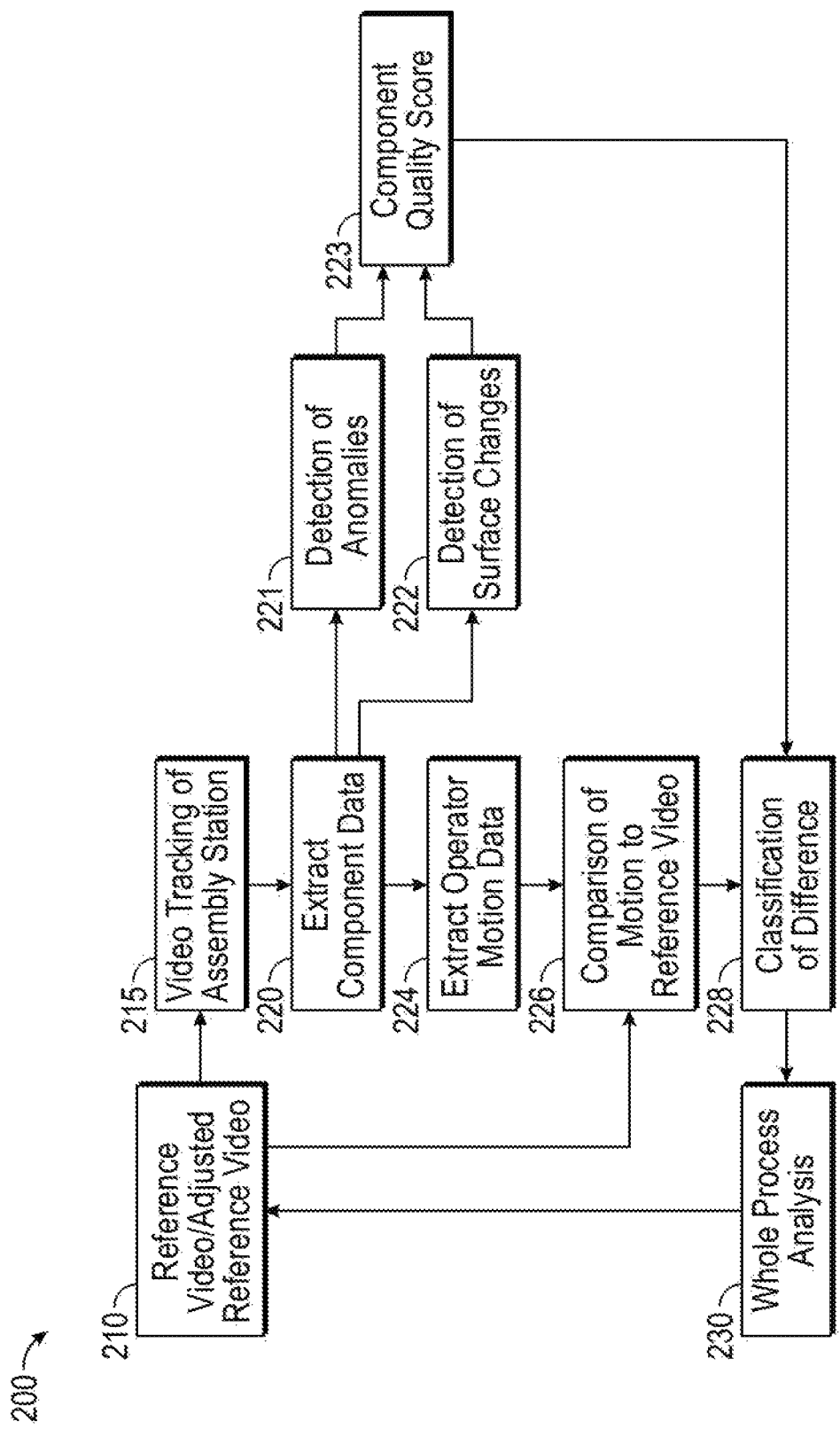
FIG. 2 illustrates an example of a process for performing assembly error correction at a given operator station, according to some aspects of the disclosed technology.

FIG. 2 illustrates an example process 200 for performing error detection analysis that can be used to facilitate assembly error correction, according to some aspects of the technology.

Beginning at step 210, a process of using idealized video guidance to improve manufacturing/assembly can be implemented. In step 215, video tracking of one or more assembly stations is performed. Video tracking can include the recording of a human operator at a given station/node. In some embodiments video tracking can further include the capture of component attributes at a given station/node.

In steps 220-224, processing is performed to analyze the recorded video from the assembly station. For example, in some embodiments, background extraction can be performed to isolate movements/components in the recorded video. In some aspects, once background extraction is completed, the processed video contains only motion/video data relating to the assembly operator (step 224) and the components involved used in the corresponding assembly step (step 220). In step 220, additional processing can be performed to isolate the part/component. As illustrated by the diagram of process 200, step 220 can include additional processing operations, including anomaly detection (step 221), detection of surface changes (222), and a part classification and/or quality scoring (step 223). It is understood that any of the video processing steps may be performed using various signal and/or image processing techniques, including but not limited to the use of one or more AI/machine learning algorithms and/or classifiers, e.g., to perform anomaly detection (221), detect surface changes (222), and/or perform scoring/classification (step 223).

After completion of processing steps 220-224, process 200 can proceed to step 226, where motion comparison is performed. Motion comparison (step 226) can include the comparison of process assembly station video data, involving one or more station operators at one or more stations/nodes, with corresponding idealized video/motion data. Motion comparison performed across multiple stations/nodes can be used to infer/predict variations in resulting part/component quality.

In step 228, variance/quality classifications for various parts/components can be performed. By way of example, parts/components can be classified into different quality tiers and/or may be identified for removal or repair, depending on their associated classifications/differences.

After classifications/differences have been determined, process 200 can proceed to step 230 in which an analysis of the entire process/workflow is performed, e.g., based on the classifications/differences for each station/node determined in steps 226 and 228. By analyzing the entire workflow, automated adjustments to video can be made, to address detected deviations/defects, as discussed above.

Figure 3:
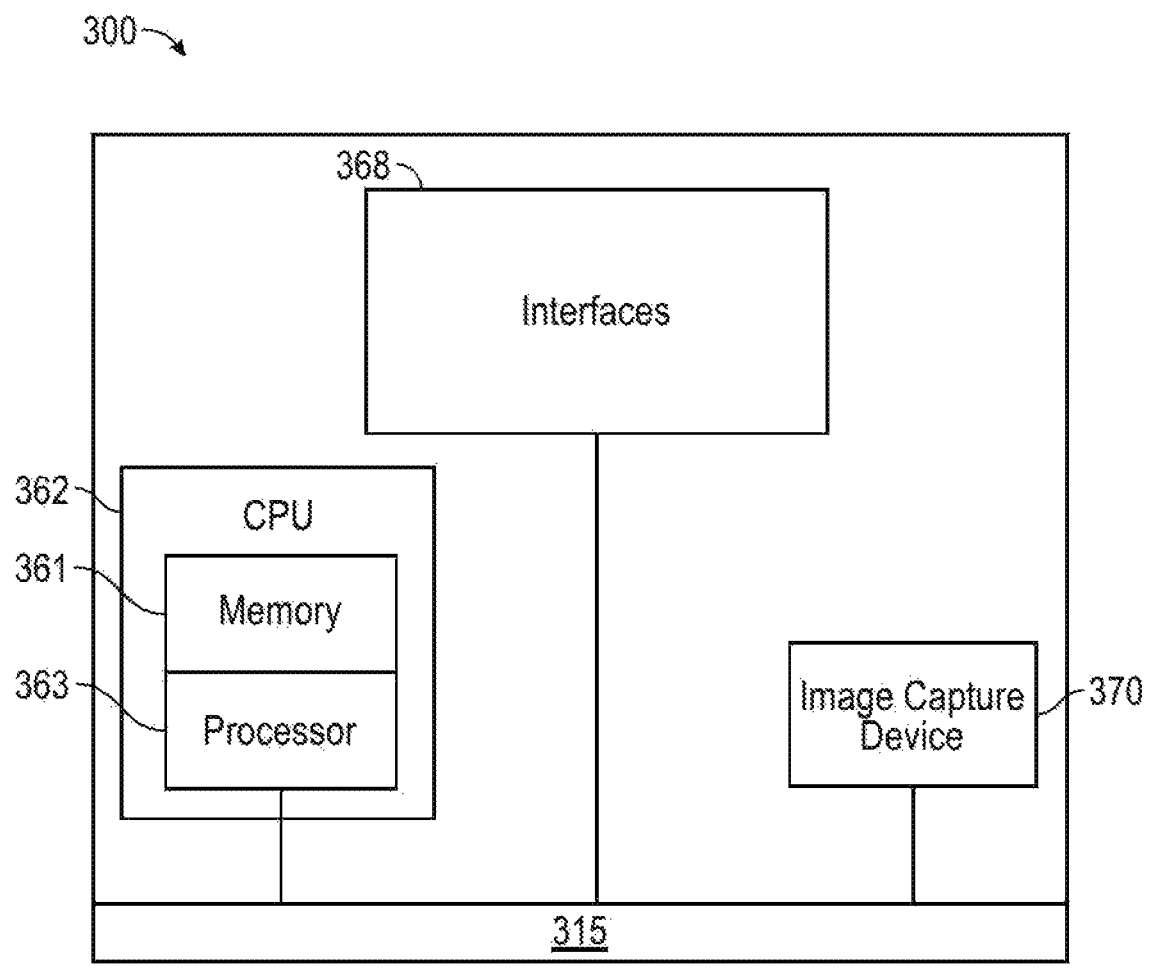
FIG. 3 illustrates an example of an electronic system with which some aspects of the subject technology can be implemented.

FIG. 3 illustrates an example processing-device that can be used to implement a system of the disclosed technology. Processing-device 300 includes a master central processing unit (CPU) 362, interfaces 368, and a bus 315 (e.g., a PCI bus). When acting under the control of appropriate software or firmware, the CPU 362 is responsible for performing various error detection monitoring and process adjustment steps of the disclosed technology. CPU 362 preferably accomplishes all these functions under the control of software including an operating system and any appropriate applications software. CPU 362 may include one or more processors 363 such as a processor from the Motorola family of microprocessors or the MIPS family of microprocessors. In an alternative embodiment, processor 363 is specially designed hardware for controlling the operations of AIPC system 310. In a specific embodiment, a memory 361 (such as non-volatile RAM and/or ROM) also forms part of CPU 462. However, there are many different ways in which memory could be coupled to the system.

In some aspects, processing-device 310 can include, or can be coupled with, an imaging processing system 370. Image processing system 370 can include various image capturing devices, such as video cameras, that are capable of monitoring operator movements, and generating motion data. By way of example, image processing system 370 can be configured to capture video data and/or to output/generate a 3D point cloud.

Interfaces 368 are typically provided as interface cards (sometimes referred to as "line cards"). Generally, they control the sending and receiving of data packets over the network and sometimes support other peripherals used with the router. Among the interfaces that can be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 362 to efficiently perform routing computations, network diagnostics, security functions, etc.

Although the system shown in FIG. 3 is one specific processing device of the present invention, it is by no means the only network device architecture on which the present invention can be implemented. For example, an architecture having a single processor that handles communications as well as routing computations, etc. is often used. Further, other types of interfaces and media could also be used.

Regardless of the network device's configuration, it may employ one or more memories or memory modules (including memory 361) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 300 can practice all or part of the recited methods, can be a part of the recited systems, and/or can operate according to instructions in the recited non-transitory computer-readable storage media. Such logical operations can be implemented as modules configured to control the processor 363 to perform particular functions according to the programming of the module.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A method for optimizing workflow in an assembly line, the method comprising:
    monitoring tooling at a step of an assembly process for assembling a target object;
    based on the monitoring, detecting, at the step of the assembly process of the target object, an error in assembly of the target object using a first neural network model;
    evaluating data associated with the tooling at the step of the assembly process using a second neural network to predict a quality metric for the target object;
    comparing the quality metric for the target object at the step of the assembly process to a nominal object at the step of the assembly process;
    based on the comparing, determining that the quality metric is out of specification;
    based the determining, generating an updated sequence of steps to bring the target object into specification using a gated recurrent unit model; and
    adjusting subsequent steps in the assembly process using updated assembly instructions for the target object based on the updated sequence of steps.

2. The method of claim 1, wherein the target object is evaluated against the nominal object at the step of the assembly process.

3. The method of claim 1, wherein the target object is evaluated against a final configuration of the nominal object.

4. The method of claim 1, wherein the updated sequence of steps is configured to minimize a deviation between the target object and the nominal object.

5. The method of claim 4, wherein the deviation is determined based on a similarity between the updated sequence of steps to complete the assembly process of the target object and another sequence of steps to complete the assembly process of the nominal object.

6. The method of claim 4, wherein the deviation is minimized using a Markov Decision Process (MDP) through a reward formulation.

7. The method of claim 1, wherein a stochastic gradient descent method is used to derive the updated sequence of steps to complete the assembly process of the target object.

8. A system for optimizing workflow in an assembly line, the system comprising:
    a plurality of image capture devices, wherein each of the plurality of image capture devices is disposed at a different position to capture movement of an operator during an assembly process of a target object; and
    an assembly instruction module configured to automatically modify guidance and instructions provided to the operator, wherein the assembly instruction module is coupled to the plurality of image capture devices, and wherein the assembly instruction module is configured to perform operations comprising:

receiving, by the assembly instruction module, motion data from the plurality of image capture devices, wherein the motion data corresponds to performance of a set of steps by the operator to assemble the target object;

determining, based on the motion data and at a step of the set of steps, an error in assembly of the target object using a first neural network model;

evaluating the motion data using a second neural network model to predict a quality metric for the target object;

comparing the quality metric for the target object to a nominal object;

based on the comparing, determining that the quality metric is out of specification;

based the determining, generating an updated sequence of steps to bring the target object into specification using a gated recurrent unit model; and adjusting subsequent steps in the assembly processing using updated assembly instructions that are provided to the operator based on the updated sequence of steps.

9. The system of claim 8, wherein the motion data includes digital recordings of hand movements of the operator during the assembly of the target object.

10. The system of claim 8, wherein the assembly instruction module is further configured to apply a stochastic gradient descent method to derive the updated sequence of steps.

11. The system of claim 8, wherein the updated sequence of steps is configured to minimize a deviation between the target object and the nominal object.

12. The system of claim 11, wherein the deviation is determined based on a similarity between the updated sequence of steps to complete the assembly of the target object and another sequence of steps to complete the assembly of the nominal object.

13. The system of claim 11, wherein the deviation is minimized using a Markov Decision Process (MDP) through a reward formulation.

14. The system of claim 8, wherein the assembly instruction module is further configured to:

extract, from the motion data, a set of images that represent the assembly of the target object; and evaluate the set of images to identify the performance of the set of steps by the operator to assemble the target object.

15. A non-transitory computer-readable media comprising instructions stored thereon which, when executed by one or more processors, are configured to cause the one or more processors to perform operations comprising:

monitoring tooling at a step of an assembly process for assembling a target object;

based on the monitoring, detecting, at the step of the assembly process of a target object, an error in assembly of the target object using a first neural network model;

evaluating data associated with the tooling at the step of the assembly process using a second neural network to predict a quality metric for the target object;

comparing the quality metric for the target object at the step of the assembly process to a nominal object at the step of the assembly process;

based on the comparing, determining that the quality metric is out of specification;

based the determining, generating an updated sequence of steps to bring the target object into specification using a gated recurrent unit model; and adjusting subsequent steps in the assembly process using updated assembly instructions for the target object based on the updated sequence of steps.

16. The non-transitory computer-readable media of claim 15, further comprising:

deriving, using a stochastic gradience descent method, the updated sequence of steps.

17. The non-transitory computer-readable media of claim 15, wherein the target object is evaluated against the nominal object at the step of the assembly process.

18. The non-transitory computer-readable media of claim 15, wherein the target object is evaluated against a final configuration of the nominal object.

19. The non-transitory computer-readable media of claim 15, wherein the updated sequence of steps is configured to minimize a deviation between the target object and the nominal object.

20. The non-transitory computer-readable media of claim 19, wherein the deviation is minimized using a Markov Decision Process (MDP) through a reward formulation.

* * * * *